United States Patent
Vaindiner et al.

(10) Patent No.: US 10,133,953 B2
(45) Date of Patent: Nov. 20, 2018

(54) SYSTEM AND METHOD FOR ENABLING GRAPHIC-BASED INTEROPERABILITY WITH A RUN-TIME APPLICATION

(71) Applicant: NICE LTD., Ra'anana (IL)

(72) Inventors: Alexander Vaindiner, Or-Akiva (IL); Vitaly Shelest, Holon (IL); Yuri Staloverov, Kfar Saba (IL)

(73) Assignee: NICE LTD., Ra'anana (IL)

( * ) Notice: Subject to any disclaimer, the term of this patent is extended or adjusted under 35 U.S.C. 154(b) by 39 days.

(21) Appl. No.: 15/416,484

(22) Filed: Jan. 26, 2017

(65) Prior Publication Data

US 2018/0211129 A1   Jul. 26, 2018

(51) Int. Cl.
*G06K 9/00* (2006.01)
*G06K 9/46* (2006.01)
(Continued)

(52) U.S. Cl.
CPC .............. *G06K 9/4604* (2013.01); *G06F 8/20* (2013.01); *G06K 9/00463* (2013.01);
(Continued)

(58) Field of Classification Search
CPC .............. G06K 9/4604; G06K 9/00463; G06K 9/4642; G06K 9/6267; G06T 7/62; G06T 15/005; G06T 2207/20072; G06F 8/20; G06F 8/38; G06F 8/24; G06F 8/10; G06F 8/35; G06F 9/451; G06F 9/541; G06F 9/547; G06F 9/45533; G06F 9/45537; G06F 9/548; G06F 9/543; G06F 17/243; G06F 17/30557; G06F 17/30604; G06F 17/30914; G06F 3/0482; G06F 3/04842; G06F 3/04847; G06F 3/1407; G06F 3/0481; G06F 15/177; G01R 13/345; G06Q 10/103; H04L 65/403; H04L 67/02; H04L 67/025;
(Continued)

(56) References Cited

U.S. PATENT DOCUMENTS 5,481,741 A * 1/1996 McKaskle ............. G06F 3/0481
                                                                 345/522
6,789,054 B1 * 9/2004 Makhlouf ................ G06F 8/10
                                                                 703/22
(Continued)

*Primary Examiner* — Jose L Couso
(74) *Attorney, Agent, or Firm* — Pearl Cohen Zedek Latzer Baratz LLP

(57) ABSTRACT

A system and method for enabling graphic-based interoperability with a run-time application is configured to, during a design-time (DT) mode: receive a DT application image; identify DT visual objects within the DT application image; generate DT bounding shape objects in which each DT bounding shape object bounds one or more DT visual objects identified within the DT application image; define bounding shape properties for the DT bounding shape objects; and store as a scene, data relating to the DT application image, the DT visual objects, the DT bounding shape objects, and the bounding shape properties, for later recall; and during a run-time (RT) mode: recall the scene stored during the DT mode; capture a RT application image; identify RT visual objects within the RT application image based on the scene; generate RT bounding shape objects, and apply the bounding shape properties to the generated RT bounding shape objects.

22 Claims, 10 Drawing Sheets

(51) Int. Cl.
    *G06K 9/62*         (2006.01)
    *G06T 7/62*         (2017.01)
    *G06F 8/20*         (2018.01)

(52) U.S. Cl.
    CPC ......... *G06K 9/4642* (2013.01); *G06K 9/6267* (2013.01); *G06T 7/62* (2017.01); *G06T 2207/20072* (2013.01)

(58) Field of Classification Search
    CPC ......... H04L 67/2823; Y10S 707/99943; G05B 15/02; G05B 19/042; G05B 2219/35582; Y02P 90/265
    See application file for complete search history.

(56) References Cited

U.S. PATENT DOCUMENTS

| | | | | |
|---|---|---|---|---|
| 2004/0123238 A1* | 6/2004 | Hefetz | ................... | G06F 9/451 |
| | | | | 715/234 |
| 2004/0243931 A1* | 12/2004 | Stevens | ................... | G06F 8/38 |
| | | | | 715/236 |
| 2006/0026519 A1* | 2/2006 | Vaindiner | ................ | G06F 8/38 |
| | | | | 715/700 |
| 2009/0119578 A1* | 5/2009 | Relyea | ................... | G06F 9/451 |
| | | | | 715/234 |
| 2011/0088011 A1* | 4/2011 | Ouali | ....................... | G06F 8/10 |
| | | | | 717/105 |
| 2018/0129545 A1* | 5/2018 | Beckett | .................. | G06F 9/541 |
| 2018/0176272 A1* | 6/2018 | Zur | ..................... | C07D 487/22 |

* cited by examiner

— 800

| Scene Data | Anchor Properties | Control properties |
|---|---|---|
| Name | Name | Name |
| Window Caption | Tree Path | Control Type |
| Window Class Name | Text | Shape Type |
| Process Name | Child Contours Count | Tree Path |
| Window Styles | Shape Rectangle | Shape Rectangle |
| Window Rectangle | | Parent Path |
| Threshold values | | Anchor Name |
| Minimum shape size | | |
| Window Image | | |
| | | |

FIG. 8

| Control Name | Methods | Properties | Events |
|---|---|---|---|
| Frame Window | Get Text with OCR | Caption(OCR) | create, destroy |
| Button | Click | Caption(OCR) | clicked |
| Link | Click | Caption(OCR) | clicked |
| Table | Get Cell Text with OCR<br>Set Cell Text | Cell, Row | Selected<br>Text change |
| List Box, List View | Select item | | Selected |
| Tab | Select Tab | | Selected |
| Text | | Text | Text change |
| General Control | Get Text with OCR<br>Set Text | | Clicked<br>Text change |
| Check Box | Check/Uncheck | | Checked/Unchecked |
| Radio Button | Check/Uncheck | | Checked/Unchecked |

FIG. 10

SYSTEM AND METHOD FOR ENABLING GRAPHIC-BASED INTEROPERABILITY WITH A RUN-TIME APPLICATION

FIELD OF THE INVENTION

The present invention is in the field of interoperability. In particular, the present invention is directed to systems and methods for enabling graphic-based interoperability with a run-time application.

BACKGROUND OF THE INVENTION

Interoperability, as understood herein, refers to the ability of a system, product, or application to work with other systems, products, or applications without special effort on the part of the customer. Although many applications exist which can expose an external graphical user interface (GUI) for interoperability via an application programming interface (API) or built on the basis of one or more software development kits (SDKs) which allow interaction with the GUI by various low-level programming techniques, there exist a wide range of applications which cannot be connected by any existing technique.

An example of an application which often cannot be connected by standard API and/or SDK techniques as described above is an application running in a remote environment (e.g., in a server/client architecture). In this case, the user (client) may be able to see an image of an application on the screen of the client device and perform various input operations using a keyboard and/or mouse, but existing application integration techniques cannot recognize user interface (UI) elements or connect to any API exposed by the application, even when such APIs exist and are ready to use. Examples of remote environments in which this problem is prevalent include Microsoft Remote Desktop, Citrix XenApp, PCAnywhere, Oracle VM, etc.

Commonly, this kind of interoperability problem can be described by or attributed to one or more of the following issues: lack of a reliable connector for an interaction with such applications; there is no object model exposed by GUI elements or objects (for example, buttons, list boxes, links, tables, etc.) of these application types; and lack of a satisfactory algorithm for recognizing GUI elements at run-time.

One present attempt at solving the interoperability issue includes technology focused on Optical Mark Recognition (OMR), which is used with Optical Character Recognition (OCR) engines to format text while generating a specific text document. OMR also provides the ability to recognize a text document with a template designed by Developers. However, OMR and similar technologies do not provide an ability to interact with an application image, among other deficiencies. Presently, a great deal of research and development is needed, and tremendous effort is required to be invested, to find methods of connectivity, if possible, for even simple interactions with many target applications (e.g., OCR, mouse click, etc.).

SUMMARY OF THE INVENTION

An embodiment of the invention includes a method for enabling graphic-based interoperability with a run-time application. In some embodiments, the method may be performed on a computer having a processor and memory, and one or more code sets stored in the memory and executing in the processor. The method may include, during a design-time (DT) mode: receiving a DT application image; identifying one or more DT visual objects within the DT application image; generating one or more DT bounding shape objects, in which each of the one or more DT bounding shape objects may bound one or more of the one or more DT visual objects identified within the DT application image; defining one or more bounding shape properties for at least one of the one or more DT bounding shape objects; and storing, as a scene, data relating to the DT application image, the one or more DT visual objects, the one or more DT bounding shape objects, and the one or more bounding shape properties, for later recall; and during a run-time (RT) mode: recalling the scene stored during the DT mode; capturing a RT application image; identifying one or more RT visual objects within the RT application image based on the scene; generating one or more RT bounding shape objects, and applying one or more of the one or more bounding shape properties to one or more of the generated one or more RT bounding shape objects.

In some embodiments, identifying the one or more DT visual objects may include identifying at least one of one or more edges and one or more contours which define at least part of a given visual object. In some embodiments, defining the one or more shape properties may include identifying at least one anchor, in which an anchor may represent a given visual object in the DT application image having internal content which remains constant from the design-time mode to the run-time mode.

In some embodiments, defining the one or more shape properties may include identifying at least one control, in which a control associates a given visual object with a control type for which an interaction with the control may be defined within the run-time stage. In some embodiments, the control type may include one of a frame window, a button, a link, a list box, a check box, a table, a drop-list, a combination box, a tab, and a slider. In some embodiments, the method may further include constructing a DT histogram based on the defined one or more bounding shape properties.

In some embodiments, recalling may include at least one of recalling the DT application image; regenerating the one or more DT bounding shape objects; redefining the one or more bounding shape properties for at least one of the one or more DT bounding shape objects; and reconstructing the DT histogram based on the defined one or more bounding shape properties.

In some embodiments, the one or more RT visual objects may include at least one of a window frame, an anchor, and a control. In some embodiments, the method may further include identifying at least one control based on at least one of an anchor to which it is bound, and a geometric relationship between the at least one control and other previously identified objects in the RT application image.

In some embodiments, generating the one or more RT bounding shape objects may include building an object model of the corresponding type of GUI object for each of the one or more RT bounding shape objects, in which an object model may include a given plurality of bounding shape properties. In some embodiments, applying the one or more of the one or more bounding shape properties to one or more of the constructed one or more RT bounding shape objects may bound each of the corresponding RT bounding shape objects with respective graphics image elements.

In accordance with further embodiments of the invention, a system may be provided which may implement the methods described herein according to some embodiments of the invention.

Some embodiments of the invention directly improve the underlying functionality of the systems on which applications are executed for at least the reasons outlined herein. Some embodiments of the invention enable the development of run-time solutions for integration with various third party applications, such as applications running in remote environments having only visual representation of the UI on a client (e.g., a customer) desktop. Some embodiments of the invention enhance functionality of applications instantiated on client devices in a server/client architecture, which may make it possible to avoid unnecessary installation of software on remote servers and client devices, thus conserving memory and maximizing processing power on such servers and devices. Such enhancements may reduce total cost and development time for applications to be run in such environments.

Moreover, very often remote servers provided to customers by external information technology (IT) companies include security policies and/or physical limitations (memory usage, speed requirements, etc.) which do not allow for installation of certain applications and/or software components to these servers. Some embodiments of the invention obviate this issue by providing the functionality of such applications and/or software components without requiring actual installation on such servers. Furthermore, many applications contain components that are not accessible via existing integration technologies. Some embodiments of the invention enable otherwise unavailable access to such components, which allows minimizing time and effort of research and development to develop connectors to support these applications by providing an out-of-the-box solution for it. Furthermore, some embodiments of the invention may function as a universal real-time connector which may be used with any application type. Such a universal real-time connector may be independent of the application platform (e.g., the desktop, server, etc.) and even independent of any operation system.

These and other aspects, features and advantages will be understood with reference to the following description of certain embodiments of the invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 8 is a scene design-time data table, according to at least one embodiment of the invention;

FIG. 10 is a control methods, properties and events table, according to at least one embodiment of the invention.

Figure 1:
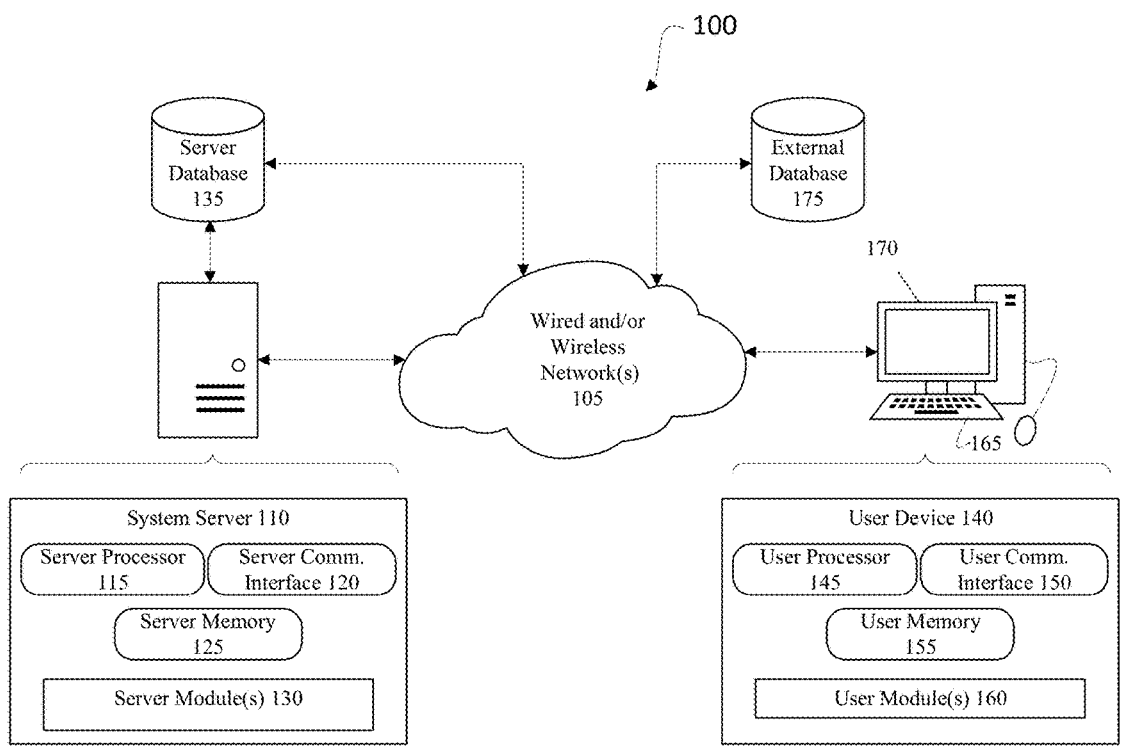
FIG. 1 is a high level diagram illustrating an example configuration of a system for enabling graphic-based interoperability with a run-time application according to at least one embodiment of the invention.

It will be appreciated that, for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory processor-readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof may occur or be performed simultaneously, at the same point in time, or concurrently.

In order to solve the interoperability issue described above, some embodiments of the invention enable graphic-based interaction with GUI elements of any application by using shape analysis of a graphical image of an application (hereinafter, "application image"), as described herein to identify objects with which interaction can be enabled. Some embodiments of the invention provide a newly designed GUI object model and/or algorithms for interaction with GUI elements of an application recognized as components in application image. Determining whether image data contains some specific object is a classic task in computer vision (e.g., image processing) systems. Some embodiments of the invention are intended to recognize well known graphical objects and graphical object types such as, for example, application windows, GUI components, etc., on, e.g., a computer screen image. For this purpose, some embodiments of the invention apply a contour and/or shapes analysis of an application image, e.g., from a captured screen image.

Some embodiments of the invention use at least two phases or modes: a design-time phase or mode for defining and collecting graphical shapes information, and a run-time phase or mode for applying the graphical shapes information to an application in real time. As understood herein, design-time may refer to a preparatory or setup type mode or stage during which embodiments of the invention may analyze an application image, e.g., by applying one or more image processing algorithms, to learn about, identify, define, and/or mark-up objects in the application image such that the those objects can be later identified, constructed, and/or made operable during a run-time mode or stage. As applied to some embodiments of the invention, during a design-time mode, a scene and/or control anchors (e.g., shape anchors) may be defined, geometric relationships between anchors may be identified, GUI control types may be specifying, and controls data, anchors data and/or the application image may be collected and/or stored.

As understood herein, run-time may refer to mode or stage during which the application is actually running and available for operability. As applied to some embodiments of the invention, during a run-time mode, an appropriate scene (e.g., the application state) may be recognized, for example, based on the collected design-time data, and interaction with GUI elements/objects of application may be enabled, e.g., as though a user were interacting directly with the application.

In some embodiments, as described in detail herein, during a design-time mode, one or more of the following actions/steps may be implemented (as described in further detail herein): edges and contours detection; polygonal approximation of each contour; calculation of shape bounding rectangle(s); defining shape properties (e.g., shape anchors and/or shape controls), such as approximate points, children counts, rectangles, child contours, etc.; defining scene anchors for control shapes. defining geometric relationships between anchors to identify controls of the scene at run-time; specifying GUI control types (e.g., shape control types), such as frame windows, buttons, links, list boxes, tables, combo boxes, tabs, sliders, etc.; and calculating an image histogram for each shape (e.g., to compare shape histograms instead of image comparison). Of course, in various embodiments, different combinations of these and/or other actions may or may not be taken as necessary.

In some embodiments, as described in detail herein, during a run-time mode, one or more of the following actions/steps may be implemented (as described in further detail herein): recognizing (e.g., identifying, finding, etc.) the frame window shape, e.g., by comparison of the image histogram (calculated at design-time) with an image histogram (created at run-time) or an application image captured at run-time; identifying one or more shape anchors by comparison of design-time/run-time histograms and/or the maximum coincidence of child contours; identifying control shapes by comparison of design-time/run-time histograms and geometric relationships between control anchors; intercepting image paint calls (e.g., BitBlt, StrechBlt, etc.) to identify image changes (representing, e.g., various application states) and provide performance optimization for remote control applications; and emulating run-time controls and their various actions, properties, and events, etc. Of course, as with the design-time mode, in various embodiments, different combinations of these and/or other actions may or may not be taken as necessary.

FIG. 1 shows a high level diagram illustrating an example configuration of a system 100 for enabling interoperability with a run-time application, according to at least one embodiment of the invention. System 100 includes network 105, which may include the Internet, one or more telephony networks, one or more network segments including local area networks (LAN) and wide area networks (WAN), one or more wireless networks, or a combination thereof. System 100 also includes a system server 110 constructed in accordance with one or more embodiments of the invention. In some embodiments, system server 110 may be a stand-alone computer system. In other embodiments, system server 110 may include a network of operatively connected computing devices, which communicate over network 105. Therefore, system server 110 may include multiple other processing machines such as computers, and more specifically, stationary devices, mobile devices, terminals, and/or computer servers (collectively, "computing devices"). Communication with these computing devices may be, for example, direct or indirect through further machines that are accessible to the network 105.

System server 110 may be any suitable computing device and/or data processing apparatus capable of communicating with computing devices, other remote devices or computing networks, receiving, transmitting and storing electronic information and processing requests as further described herein. System server 110 is therefore intended to represent various forms of digital computers, such as laptops, desktops, workstations, personal digital assistants, servers, blade servers, mainframes, and other appropriate computers and/or networked or cloud based computing systems capable of employing the systems and methods described herein.

System server 110 may include a server processor 115 which is operatively connected to various hardware and software components that serve to enable operation of the system 100. Server processor 115 serves to execute instructions to perform various operations relating to advanced search, and other functions of embodiments of the invention as described in greater detail herein. Server processor 115 may be one or a number of processors, a central processing unit (CPU), a graphics processing unit (GPU), a multi-processor core, or any other type of processor, depending on the particular implementation.

System server 110 may be configured to communicate via communication interface 120 with various other devices connected to network 105. For example, communication interface 120 may include but is not limited to, a modem, a Network Interface Card (NIC), an integrated network interface, a radio frequency transmitter/receiver (e.g., Bluetooth wireless connection, cellular, Near-Field Communication (NFC) protocol, a satellite communication transmitter/receiver, an infrared port, a USB connection, and/or any other such interfaces for connecting the system server 110 to other computing devices and/or communication networks such as private networks and the Internet.

In certain implementations, a server memory 125 is accessible by server processor 115, thereby enabling server processor 115 to receive and execute instructions such as a code, stored in the memory and/or storage in the form of one or more software modules 130, each module representing one or more code sets. The software modules 130 may include one or more software programs or applications (collectively referred to as the "server application") having computer program code or a set of instructions executed partially or entirely in server processor 115 for carrying out operations for aspects of the systems and methods disclosed herein, and may be written in any combination of one or more programming languages. Server processor 115 may be configured to carry out embodiments of the present invention by, for example, executing code or software, and may execute the functionality of the modules as described herein.

In some embodiments of FIG. 1, the exemplary software modules may include a communication module, and/or other modules and/or code as described herein. The communication module may be executed by server processor 115 to facilitate communication between system server 110 and the various software and hardware components of system 100, such as, for example, server database 135, client device 140, and/or external database 175 as described herein.

Of course, in some embodiments, server modules 130 may include more or less actual modules which may be executed to enable these and other functionalities of the invention. The modules described herein are therefore intended to be representative of the various functionalities of system server 110 in accordance with some embodiments of the invention. It should be noted that in accordance with various embodiments of the invention, server modules 130 may be executed entirely on system server 110 as a stand-alone software package, partly on system server 110 and partly on user device 140, or entirely on user device 140.

Server memory 125 may be, for example, a random access memory (RAM) or any other suitable volatile or non-volatile computer readable storage medium. Server memory 125 may also include storage which may take various forms, depending on the particular implementation. For example, the storage may contain one or more components or devices such as a hard drive, a flash memory, a rewritable optical disk, a rewritable magnetic tape, or some combination of the above. In addition, the memory and/or storage may be fixed or removable. In addition, memory and/or storage may be local to the system server 110 or located remotely.

In accordance with further embodiments of the invention, system server 110 may be connected to one or more database(s) 135, for example, directly or remotely via network 105. Database 135 may include any of the memory configurations as described herein, and may be in direct or indirect communication with system server 110. In some embodiments, database 135 may store information relating to user documents. In some embodiments, database 135 may store information related to one or more aspects of the invention.

As described herein, among the computing devices on or connected to the network 105 may be one or more user devices 140. User device 140 may be any standard computing device. As understood herein, in accordance with one or more embodiments, a computing device may be a stationary computing device, such as a desktop computer, kiosk and/or other machine, each of which generally has one or more processors, such as user processor 145, configured to execute code to implement a variety of functions, a computer-readable memory, such as user memory 155, a user communication interface 150, for connecting to the network 105, one or more user modules, such as user module 160, one or more input devices, such as input devices 165, and one or more output devices, such as output devices 170. Typical input devices, such as, for example, input devices 165, may include a keyboard, pointing device (e.g., mouse or digitized stylus), a web-camera, and/or a touch-sensitive display, etc. Typical output devices, such as, for example output device 170 may include one or more of a monitor, display, speaker, printer, etc.

In some embodiments, user module 160 may be executed by user processor 145 to provide the various functionalities of user device 140. In particular, in some embodiments, user module 160 may provide a user interface with which a user of user device 140 may interact, to, among other things, communicate with system server 110.

Additionally or alternatively, a computing device may be a mobile electronic device ("MED"), which is generally understood in the art as having hardware components as in the stationary device described above, and being capable of embodying the systems and/or methods described herein, but which may further include componentry such as wireless communications circuitry, gyroscopes, inertia detection circuits, geolocation circuitry, touch sensitivity, among other sensors. Non-limiting examples of typical MEDs are smart-phones, personal digital assistants, tablet computers, and the like, which may communicate over cellular and/or Wi-Fi networks or using a Bluetooth or other communication protocol. Typical input devices associated with conventional MEDs include, keyboards, microphones, accelerometers, touch screens, light meters, digital cameras, and the input jacks that enable attachment of further devices, etc.

In some embodiments, user device 140 may be a "dummy" terminal, by which processing and computing may be performed on system server 110, and information may then be provided to user device 140 via server communication interface 120 for display and/or basic data manipulation. In some embodiments, modules depicted as existing on and/or executing on one device may additionally or alternatively exist on and/or execute on another device. For example, in some embodiments, one or more modules of server module 130, which is depicted in FIG. 1 as existing and executing on system server 110, may additionally or alternatively exist and/or execute on user device 140. Likewise, in some embodiments, one or more modules of user module 160, which is depicted in FIG. 1 as existing and executing on user device 140, may additionally or alternatively exist and/or execute on system server 110.

Figure 2:
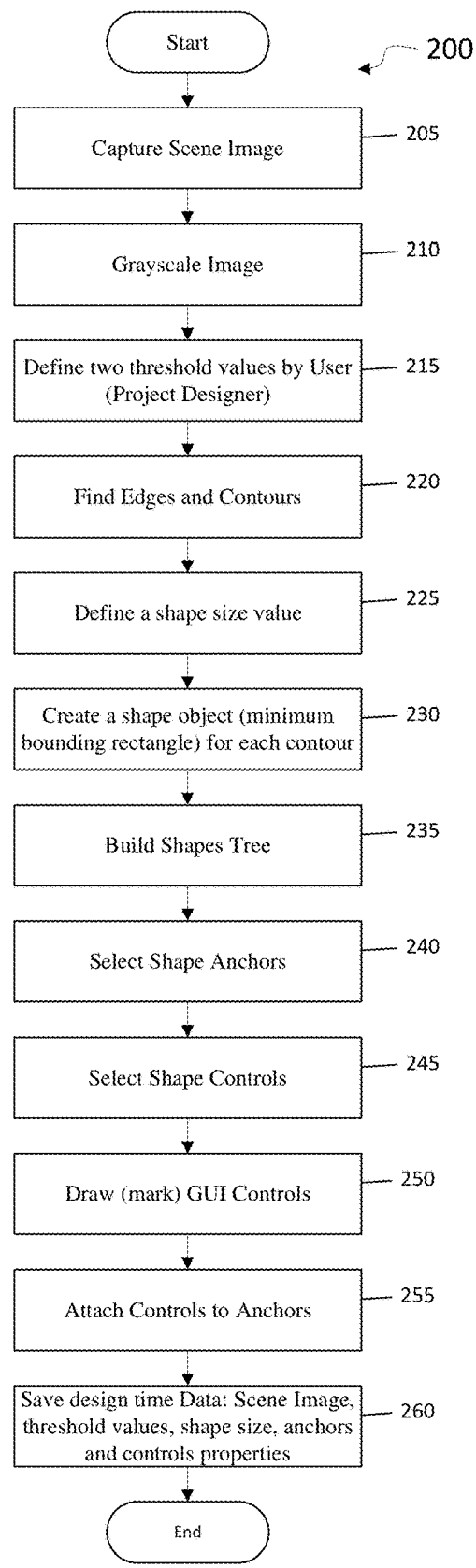
FIG. 2 is a flow diagram of a first part of a method for enabling graphic-based interoperability with a run-time application according to at least one embodiment of the invention.

FIG. 2 is a flow diagram of a first part of a method for enabling interoperability with a run-time application according to at least one embodiment of the invention. In particular, FIG. 2 depicts a flow diagram of a method 200 for identifying and/or defining GUI objects in an application image during a design-time learning stage, mode, or process, according to embodiments of the invention. It should be noted that FIG. 2 shows a learning method or process in which characteristic data models or scenes are generated and stored for later recall. Furthermore, in some embodiments, method 200 may be configured to implement one or more of the elements/features/functions of system 100, e.g., as described in detail herein.

Figure 3:
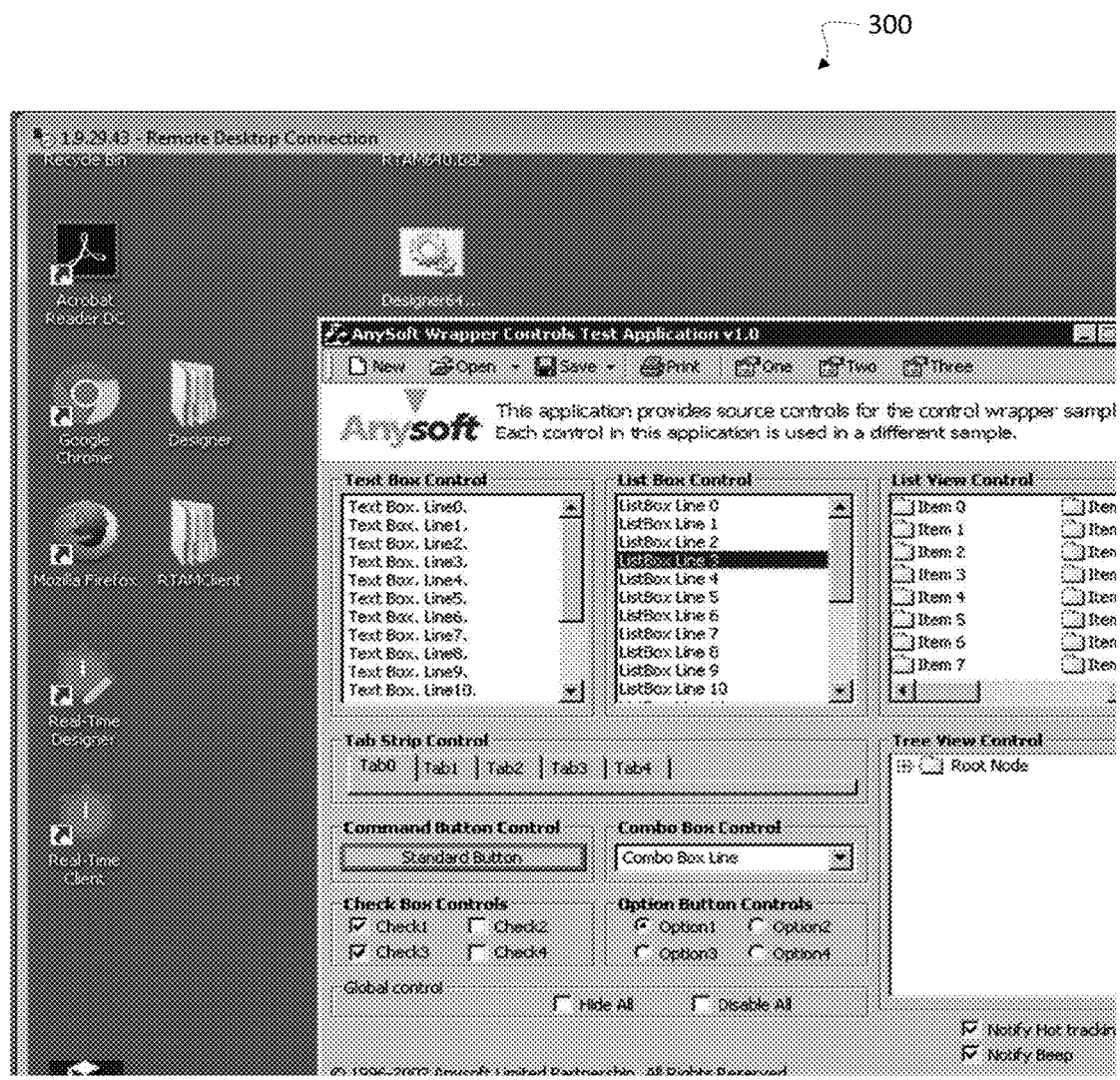
FIG. 3 is an example captured application image, according to at least one embodiment of the invention.

In some embodiments, method 200 may be performed on a computer having a processor, a memory, and one or more code sets stored in the memory and executed by the processor. In some embodiments, method 200 begins at step 205 when the processor is configured to receive a design-time application image. As understood herein, receiving may include, for example, capturing the image of the application as a "screenshot," e.g., by use of a print-screen function or other image and/or screen capture method and/or device, or receiving a previously captured image of the application. In some embodiments, the application image may include, for example, an entire application window, a portion of an application window, an entire display including portions and/or entire windows of one or more applications, a portion of a display, etc. For example, turning briefly to FIG. 3, a captured application image 300 is shown according to at least one embodiment of the invention.

Figure 4:
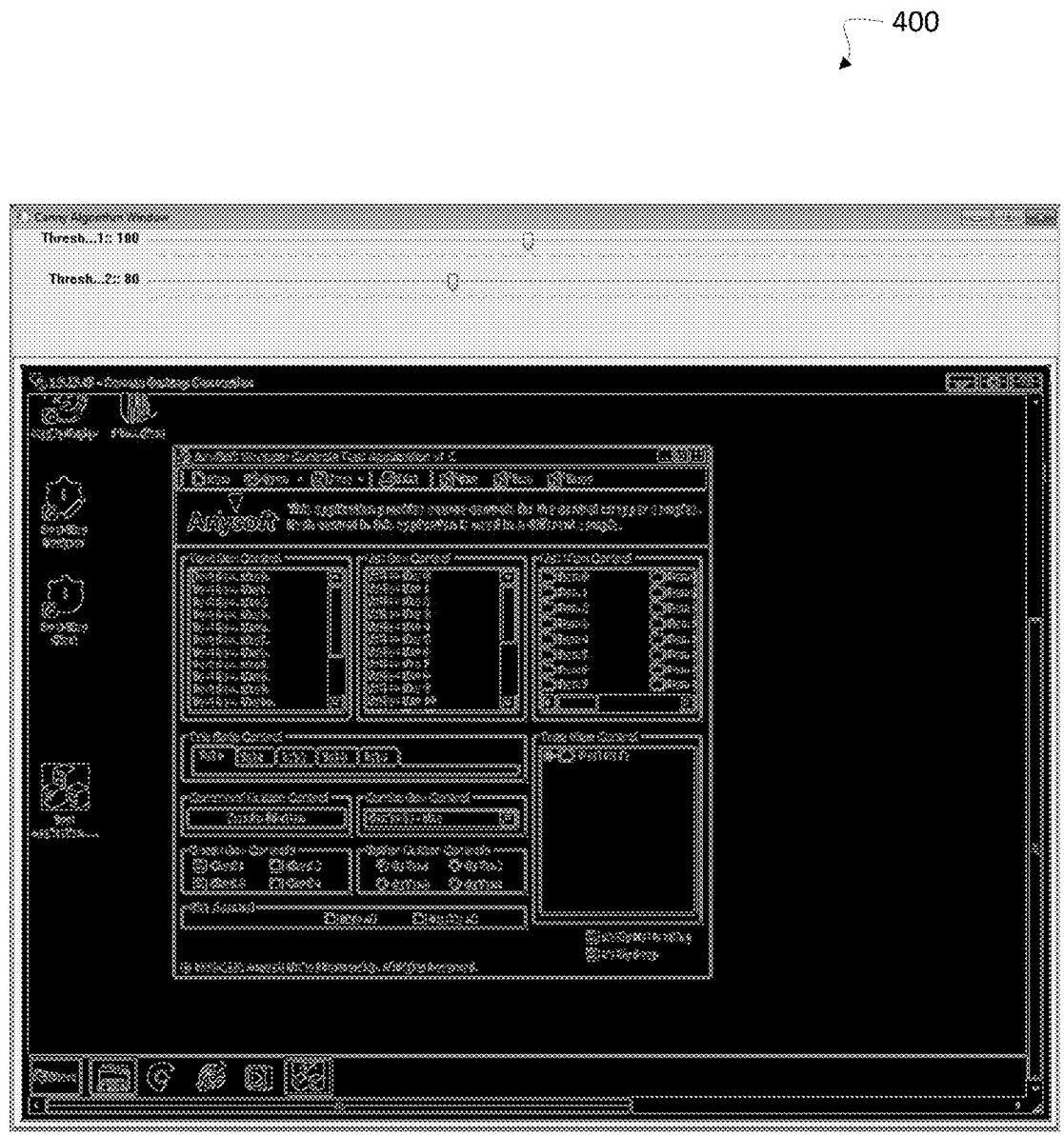
FIG. 4 is an example captured application image shown, with edges and contours, converted to grayscale, according to at least one embodiment of the invention.

At step 210, in some embodiments, the processor may then be configured to transform or convert the captured/received application image to a greyscale version of the image. For example, the image may be processed with a greyscaling function (CvCvtColor) from OpenCV library, or the like. For example, turning briefly to FIG. 4, a captured application image 400 is shown, with edges and contours, converted to grayscale according to at least one embodiment of the invention. Of course, in some embodiments, transforming or converting the application image to grayscale may not be required, necessary, or desired, for example, in embodiments where color does not impact detection/identification of edges and/or contours in the application image and/or in embodiments when the application image is already in grayscale, etc.

At step 215, in some embodiments, the processor may then be configured to define one or more (e.g., two) threshold values which impact detection of edges and contours in an image. For example, in some embodiments of the invention, the processor may receive one or more threshold values from a user to be implemented in an edge detection algorithm such as the Canny Edge Detector function (CvCanny) from OpenCV library, or the like. In some embodiments, the processor may be configured to automatically determine optimal or near optimal threshold values for detection of edges.

The Canny edge detector is an edge detection operator that uses a multi-stage algorithm to detect a wide range of edges in images. Canny edge detection is a technique to extract useful structural information from different visual objects (e.g., objects visually represented in an application image) and dramatically reduce the amount of data to be processed. In some embodiments, the Canny edge detector may apply a Gaussian filter to smooth the image in order to remove noise, find the intensity gradients of the image, apply non-maximum suppression to remove spurious responses to edge detection, track edges by hysteresis, and/or finalize the detection of edges by suppressing edges that are weak and not connected to strong edges, etc.

At step 220, in some embodiments, the processor may then be configured to find and/or identify one or more edges and/or one or more contours in the application image. For example, in some embodiments, the processor may be configured to identify one or more edges, e.g., by executing an edge detection algorithm such as the Canny Edge Detector function (CvCanny) from OpenCV library, or the like. Furthermore, for example, in some embodiments, the processor may be configured to identify one or more contours, e.g., by executing a contour detection algorithm such as the CvFindContours function from OpenCV library, or the like. In some embodiments, such a contour detection algorithm may find contours using edges returned from an executed edge detection algorithm (e.g., CvCanny function). Of course, those of ordinary skill in the relevant art will understand that there are a number of algorithms which may be implemented, alone or in combination, to filter, identify, and/or detect edges (Edges detectors), for example: Canny edge detector (operator), Sobel operator, Laplace operator, etc.

In some embodiments, for example when the application image is quite complex, visual objects in the application image may be distinguished by identifying contours (and/or edges) of such visual objects within the application image. As understood herein, a contour may be defined as a curve joining a plurality of continuous points (e.g., along the boundary), having the same color or intensity. A contour may be, for example, an external outline (e.g., stroke) of a visual object that separates it from the background and/or other visual objects in the image. Algorithms known to those of ordinary skill in the art and/or as described herein may be executed in various embodiments to implement convenient methods for the detection and manipulation of image contours. For example, a FindContours function of the OpenCV library may be used for retrieving, detecting, and/or identifying contours. In some embodiments, the processor may further implement an approximation method which may compress one or more horizontal, vertical, and/or diagonal segments, leaving, e.g., only their end points (for example, using a CV_CHAIN_APPROX_SIMPLE_method). Detection of edges and contours in an application image enables defining of bounding shape objects as result of this processing, as described herein.

At step 225, in some embodiments, the processor may then be configured to define one or more shape size values. In some embodiments, a shape size value may define, for example, a minimum and/or maximum perimeter (e.g., shape size) for which a bounding shape object may be generated as explained herein. As understood herein, a bounding shape object may be defined as a bounding shape (e.g., a rectangle), for example, a minimum bounding shape, surrounding, bounding, enclosing, identifying, and/or otherwise relating to a specific or given contour, set of contours, set of one or more edges and/or one or more contours (e.g., typically an identified visual object or other shape), etc. As such, one or more shape size values may be defined in accordance with embodiments of the invention to define, e.g., minimum and/or maximum acceptable sizes for bounding shape objects to be generated as explained herein. Minimum and/or maximum shape values may, for example, prevent the system from bounding unnecessary and/or irrelevant visual objects (e.g., visual objects which are likely too small or too large to be GUI control elements or objects of interest to the user, but which nonetheless have a definable contour). In some embodiments, one or more shape values may be calculated, estimated, recommended, and/or suggested automatically by the processor. In some embodiments, the processor may receive one or more shape values as input from a user. Furthermore, in some embodiments, e.g., when too many visual objects are identified, the processor may be configured to remove visual objects/shapes with bounding rectangles less than a previously defined shape size, e.g., in real-time, for example, based on feedback from a user.

Figure 5:
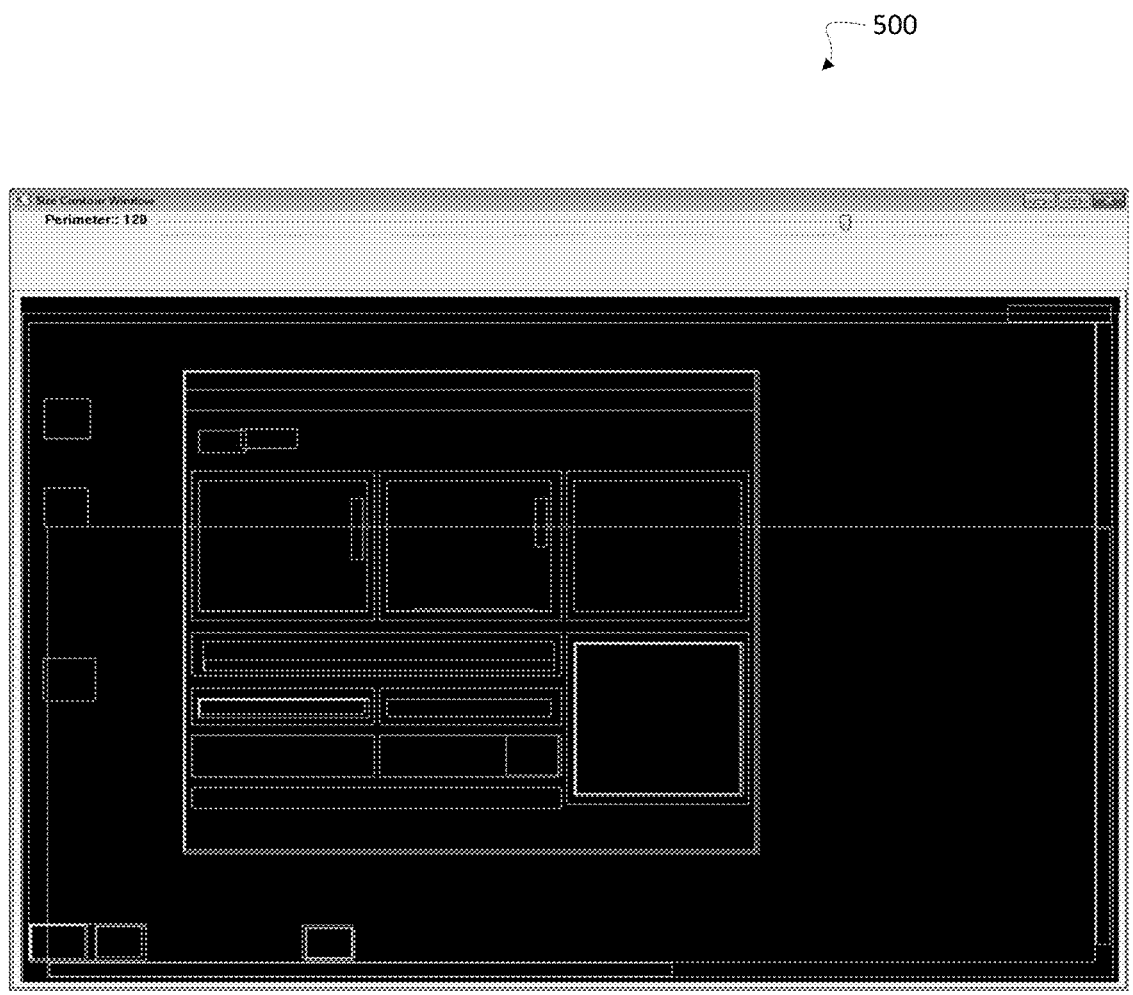
FIG. 5 is an example set of generated bounding shape objects, according to at least one embodiment of the invention.

At step 230, in some embodiments, the processor may be configured to create and/or generate a bounding shape object (e.g., a bounding shape such as a minimum bounding rectangle) for one or more contours, one or more edges, and/or one or more visual objects identified in the application image. For example, turning briefly to FIG. 5, a set of generated bounding shape objects 500 is shown according to at least one embodiment of the invention. In should be noted that while in the example embodiment of FIG. 5 rectangles were generated to bound the various objects, in other embodiments other regular and/or irregular shapes may also or alternatively be generated in order to define the boundaries of various visual objects, shapes, contours, and edges within an application image as appropriate.

Figure 6:
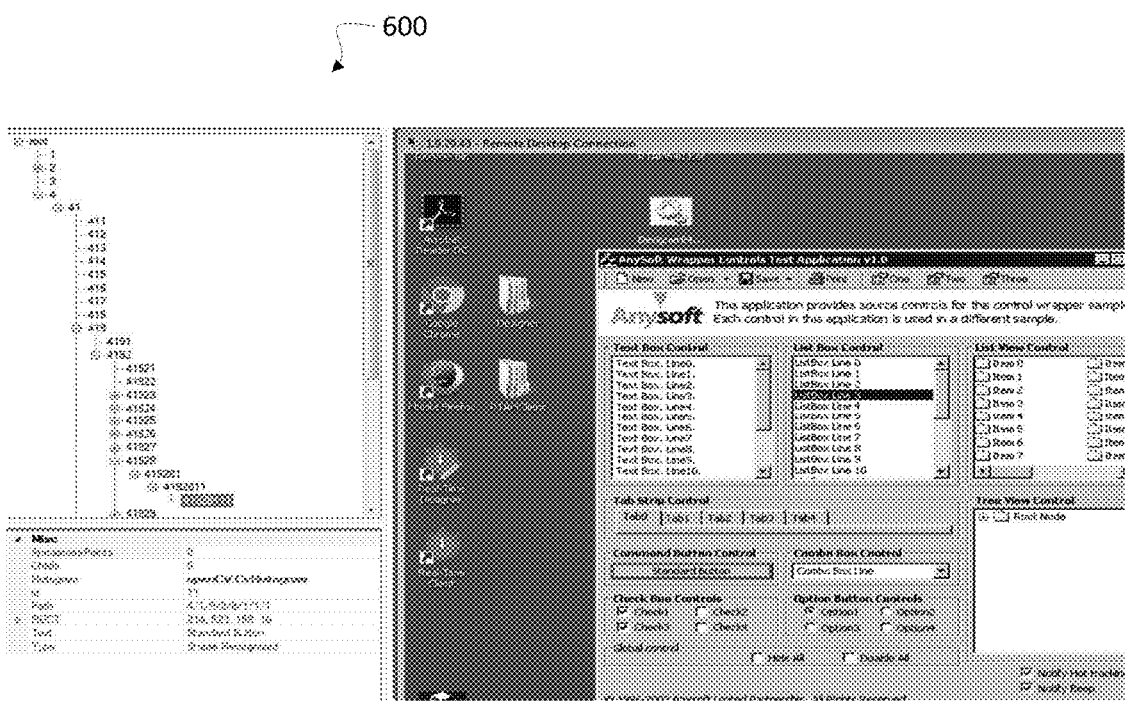
FIG. 6 is an example shapes tree, according to at least one embodiment of the invention.

At step 235, in some embodiments, the processor may be configured to build a shapes tree (e.g., a shape object tree) based on the various bounding shape objects generated in step 230. In some embodiments, for example, all bounding shape objects with a bounding rectangle larger than e.g., a defined minimum rectangle size may be placed in a shapes array. The processor may then be configured to process this array and build a shape objects tree. For example, turning briefly to FIG. 6, an example portion of a shapes tree 600 is shown according to at least one embodiment of the invention.

In some embodiments, a hierarchy of the shapes tree may be defined using an algorithm based, e.g., on coordinates nesting. Each tree node (e.g., representing a bounding shape object) may have an associated set of properties, for example: path in tree, coordinates (e.g., relative to the top left corner of the image), histogram data (as described herein), text if any (e.g., recognized using OCR), child (e.g., internal) shapes and contours, etc. In some embodiments, the shapes tree may be built in accordance with nesting coordinates. For example, each shape which encloses one or more other shapes may be considered as a parent and all shapes enclosed within may be considered as children.

In order to include histogram data in the shapes tree, in some embodiments of the invention the processor may be configured to construct a histogram (e.g., a design-time histogram) based on the defined bounding shape properties of the various bounding shape objects. Histograms can be used to represent such diverse information as the color distribution of an object, an edge gradient template of an object, the distribution of probabilities representing an expected object location, etc. Therefore, in some embodiments, the processor may identify one or more points of interest in an application image by assigning each point of interest a "tag" consisting of histograms of nearby features. Histograms of edges, colors, corners and so on may form a general feature type that is passed to classifiers for object recognition. In some embodiments a first histogram may be generated during a design-time mode, and a second histogram may be generated during a run-time mode, at which time the histograms may be compared to enable such object recognition, e.g., based on similarity of histogram data.

At steps 240-255, the processor may be configured to define, identify, associate, receive, and/or select one or more bounding shape properties for one or more of the bounding shapes (e.g., bounding shape objects). As described herein, such properties may include, for example, defining anchors and controls, etc. At step 240, the processor may be configured to define, identify, associate, receive, and/or select at least one anchor (e.g., a shape anchor) from among the one or more bounding shape objects. As understood herein, each anchor denotes shape data selected to be used in the scene identification at run-time. A set of anchors uniquely determines a scene, as described herein. An anchor is an object based on a shape of which internal (e.g., child) content (e.g., contours) is constant and cannot be changed from design-time to run-time. For example, a shape of button with constant text or an image on the face of the button may be defined as an anchor as the features of the button are not expected to change from design-time to run-time and can therefore be used to recognize the application as part of a scene (defined herein). In some embodiments, one or more anchors may be identified, determined, recommended, and/ or suggested automatically by the processor. In some embodiments, the processor may receive one or more anchor selections as input from a user.

At step 245, the processor may be configured to define, identify, associate, receive, and/or select at least one control (e.g., a GUI control) from among the one or more bounding shape objects. As understood herein, a control associates a given object with a control type for which an interaction with the control is defined within the run-time stage. For example, a control type may include one of a frame window, a button, a link, a list box, a check box, a table, a drop-list, a combination box, a tab, and a slider, etc. In some embodiments, one or more controls may be identified, determined, recommended, and/or suggested automatically by the processor. In some embodiments, the processor may receive one or more control selections as input from a user. Furthermore, in some embodiments, one or more control types for selected controls may be identified, determined, recommended, and/ or suggested automatically by the processor. In some embodiments, the processor may receive one or more control type selections as input from a user.

At step 250, in some embodiments, the processor may be configured to create one or more bounding shape objects (e.g., additional shape objects) on the basis of a shape (e.g., a rectangle) drawn (e.g., manually marked and/or otherwise digitally added) on the image. Furthermore, in some embodiments, the newly created shape object may be added to the shape objects tree.

At step 255, in some embodiments, the processor may be configured to attach or otherwise associate one or more controls to one or more anchors. By attaching controls to defined anchors, in some embodiments the processor may define one or more geometric relationships between controls and anchors, the data of which may be used to identify controls of a scene at run-time, as described herein. In some embodiments, one or more controls may be attached to one or more anchors automatically by the processor. In some embodiments, the processor may receive attachment selections as input from a user. Furthermore, in some embodiments, one or more geometric relationships between controls and anchors may be calculated identified, determined, recommended, and/or suggested automatically by the processor. In some embodiments, the processor may receive one or more geometric relationship calculations or selections as input from a user.

Figure 7:
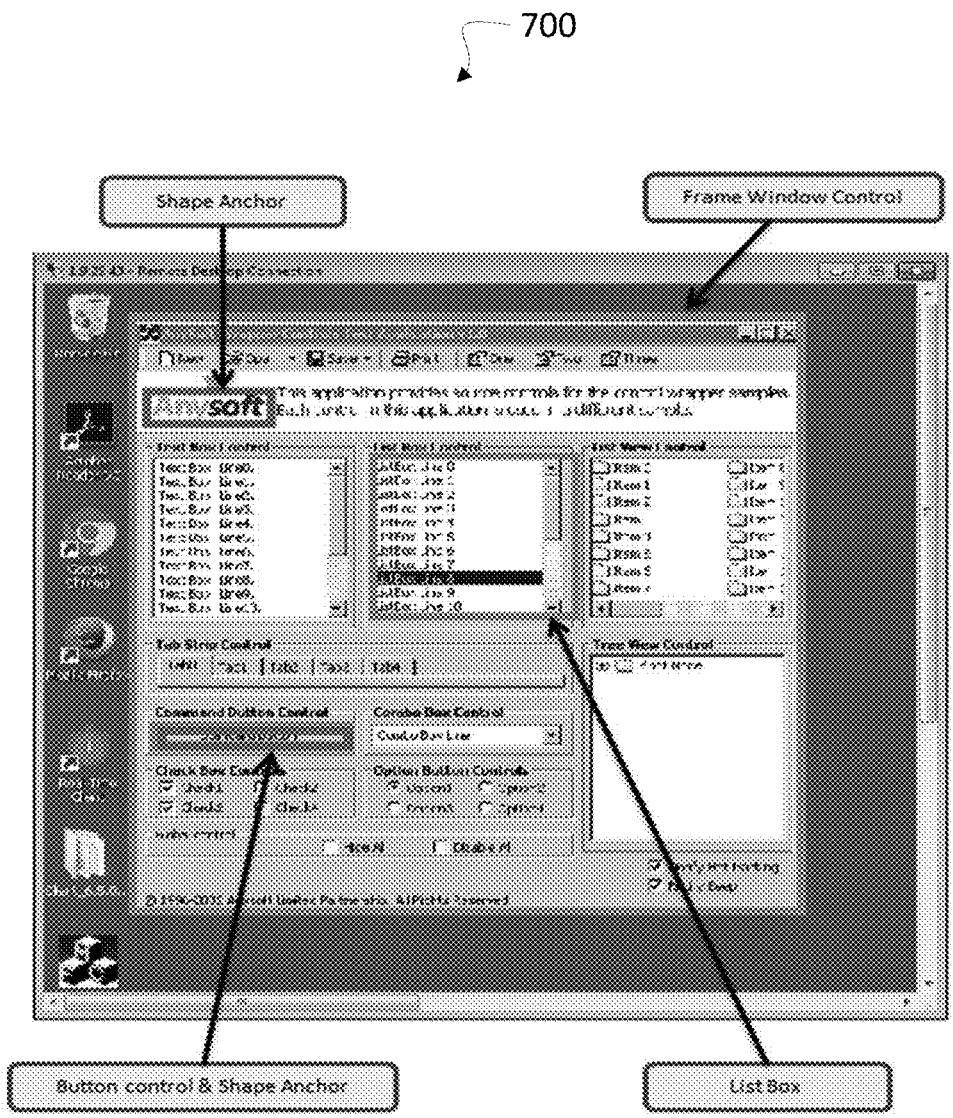
FIG. 7 is an example scene object model, according to at least one embodiment of the invention.

At step 260, in some embodiments, the processor may be configured to store, e.g., as a scene, data relating to one or more of the design-time application image, the one or more design-time visual objects, the one or more design-time bounding shape objects, the one or more bounding shape properties, the shape tree data, and/or the design-time histogram data for later recall. A scene, as understood herein, is a project object which represents an application state. It may include, for example, the captured application image, a set of anchors and/or controls, etc., e.g., defined by a user such as a Project Designer. A scene provides one or more object models which may be later recalled and used by the processor during run-time to identify an application and enable the various defined controls for the application. An object model, as understood herein, may be defined as a set of properties, methods, features, and/or events specific for an identified or given object. Turning briefly to FIG. 7, an example scene object model 700 is shown according to at least one embodiment of the invention. Furthermore, as shown in FIG. 8, the various scene data may be provided, recorded, stored, etc., in a scene design-time data table 800 as shown according to at least one embodiment of the invention. In some embodiments, additional scenes may be created, e.g., by capturing and processing additional application images as necessary. Otherwise, the design-time mode ends.

Figure 9:
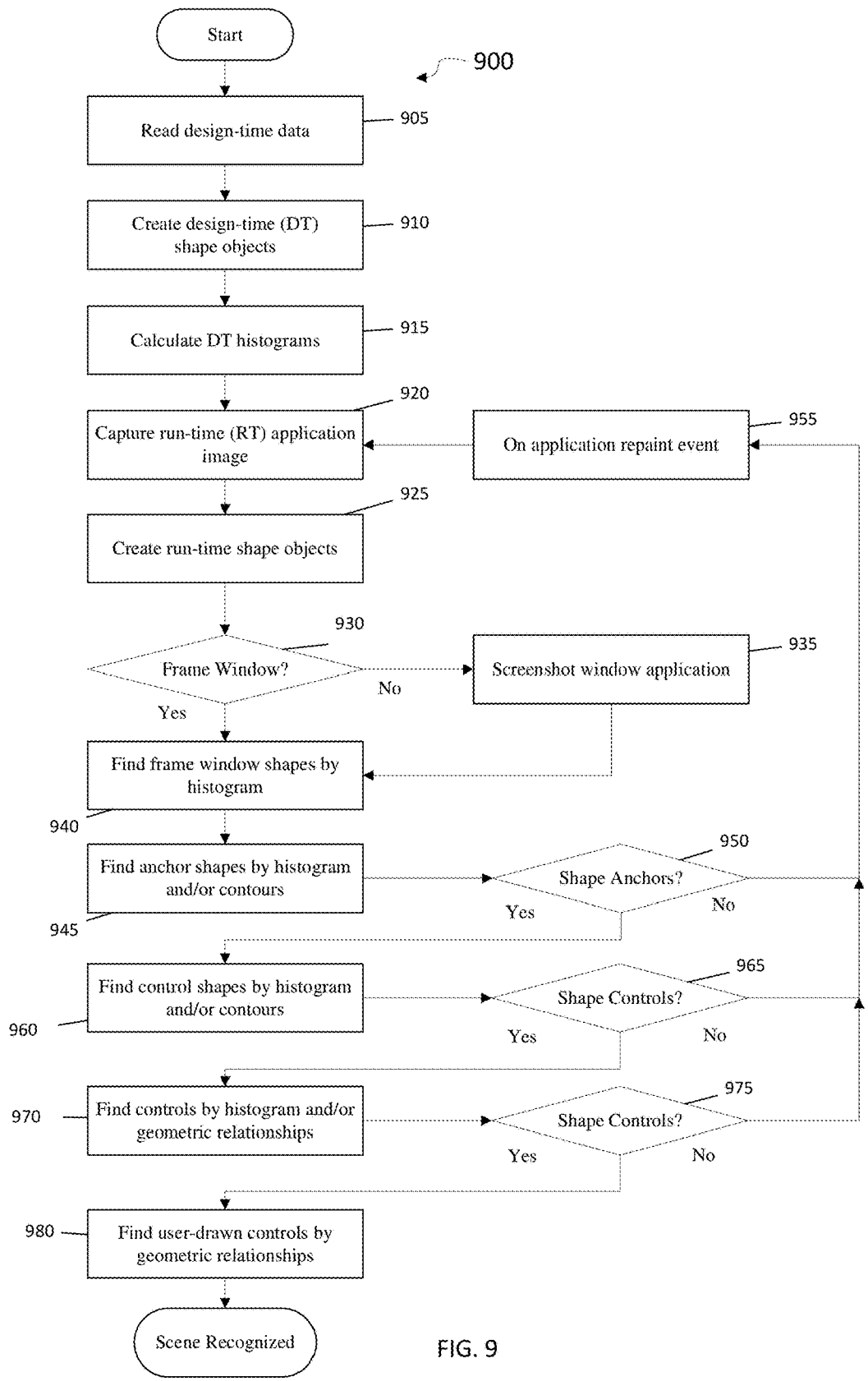
FIG. 9 is a flow diagram of a second part of a method for enabling graphic-based interoperability with a run-time application according to at least one embodiment of the invention.

To provide reliable interaction and operability with an application it may be necessary to identify the application state, particularly open windows, visible GUI elements, etc. Accordingly, embodiments of the invention enable the processor to identify the relevant application state based on the previously stored scene (e.g., scene object model and/or scene table data, etc.). FIG. 9 is a flow diagram of a second part of a method for enabling interoperability with a run-time application according to at least one embodiment of the invention. In particular, FIG. 9 depicts a flow diagram of a method 900 for identifying an application based on detected visual elements (e.g., GUI objects) of the application during a run-time stage, mode, or process, according to embodiments of the invention. In some embodiments, method 900 may be configured to implement one or more of the elements/features/functions of system 100, e.g., as described in detail herein.

In some embodiments, method 900 may be performed on a computer having a processor, a memory, and one or more code sets stored in the memory and executed by the processor. In some embodiments, method 900 begins at step 905 when the processor is configured to receive, recall, read, and/or reload a scene (e.g., the scene stored in step 260 of FIG. 2) containing design-time data. In some embodiments, while a client application is starting up (e.g., loading), for example, on a remote desktop environment on a client/user device, the scene may be concurrently recalled and the design-time scene data (e.g., design-time (DT) application image, anchors and controls with DT properties, threshold values, shape sizes etc.) may be read and/or loaded. Of course, in other embodiments, scene data may be preloaded even before an application is run.

At step 910, in some embodiments, the processor may be configured to create (e.g., recreate) one or more design-time bounding shape objects for implementation or use during run-time. In some embodiments, one or more of bounding shape objects, a corresponding shapes tree, bounding shape properties, anchors, controls, etc., may be built, generated, constructed, and/or calculated with the same or similar algorithms, processes, methods, etc., as at design-time, described in detail with regard to FIG. 2. In some embodiments, for each anchor and/or control defined in the scene during the design-time mode, a sub-image may be extracted from the design-time application image. In some embodiments, the extraction may be based, for example, on relative coordinates of the shape object with respect to an anchor or a control. Such sub-images may be used for example, to overlay and/or identify controls and/or anchors in an application during run-time, e.g., in place of bounding objects. In some embodiments, while rebuilding a project (e.g., a scene and/or one or more components of the scene) and applying it at run-time, the application image may therefore be split into a set of pieces (e.g., saved as sub-images) corresponding to the various GUI element recognized. For example, turning again briefly to FIG. 7, a List Box, Button Control, Shape Anchor, Frame Window Control, etc., may be extracted as sub-images, which may be used as overlays during run-time creation of bounding shape objects, as described herein.

At step 915, in some embodiments, the processor may be configured to calculate (e.g., recalculate) the DT Histogram (e.g., as previously described in step 235). In some embodiments, the DT histogram may be calculated using a sequential call to a library such as, e.g., OpenCV to execute functions (e.g., CvCreateHist, CvCalcHist, CvNormalizeHist) to create, calculate, and normalize the histogram.

At step 920, in some embodiments, the processor may be configured to capture a run-time (RT) application image. As understood herein, capturing may include, for example, capturing the image of the application as a "screenshot," e.g., by use of a print-screen function or other image and/or screen capture method and/or device, or receiving a captured image of the application, e.g., from an external image capturing device, etc.

Of course, in other embodiments, the processor may implement different methods and/or processes to take or capture the application image at run-time, depending on the application type and/or the environment in which it is running. For example, in some applications (such as the Remote Desktop application, for example) which are drawn on the screen only by image functions, the processor may be configured to intercept image paint calls (e.g., BitBlt, StrechBlt, etc.). For other applications, in some embodiments, the processor may capture a screenshot when an application repaint event arrives. In some embodiments, the RT application image may include, for example, an entire application window, a portion of an application window, an entire display including portions and/or entire windows of one or more applications, a portion of a display, etc.

At step 925, in some embodiments, the processor may be configured to create one or more run-time bounding shape objects, for example, corresponding to, relating to, and/or associated with, one or more design-time objects, as described herein. In particular, in some embodiments, one or more RT Image bounding shape objects and/or a run-time shapes tree may be created, built, constructed, generated, and/or calculated with the same or similar algorithms, processes, methods, etc., as at design-time, described in detail with regard to FIG. 2, e.g., on the basis of one or more identified bounding shape properties as described herein. It should be noted that, in some embodiments, the run-time state of the application may not coincide precisely or at all with the design-time state due to resizing and/or how the application appears on the screen in other environments, in other applications (windows), etc., and therefore the set of bounding shape objects and/or the shape tree may, in some embodiments, be slightly or substantially different than those generated/created during design-time. As such, in some embodiments, for each anchor and/or control, the processor may be configured to search for appropriate shapes of the suitable size and to detect tree branch overlapped shapes. In some embodiments, one or more (e.g., typically each) of the RT bounding shape objects may be generated and/or created as an appropriate type so as to expose elements and features of the scene object model, e.g., specific for each object type. In some embodiments, these RT bounding shape objects may be overlaid with corresponding sub-images so as to replicate or otherwise visually represent the correct object type of the GUI elements for which they were created.

At step 930, in some embodiments, e.g., in order to identify the proper scene to associate with the run-time application, the processor may be configured to attempt to identify the frame window control of the run-time application, e.g., presuming it was defined in the scene at design-time. If no application frame window can be identified, at step 935, in some embodiments, the processor may be configured to capture, e.g., via a screenshot, just the run-time window application, e.g., to detect the necessary frame window information. If a frame window control is identified, then at step 940, in some embodiments, the processor may be configured to search for, detect, find, and/or identify one or more frame window shapes in the RT application image. In some embodiments, the processor may search for the frame window control in the RT application image and/or via its associated data, e.g., by executing one or more histograms comparison functions of DT frame window control data (e.g., collected during design-time) and RT shape histograms (e.g., using the OpenCV function CvCompareHist). The comparison result may be the array of RT shape objects whose histogram values are similar.

At step 945, in some embodiments, the processor may be configured to find (e.g., detect, identify, etc.) one or more RT anchor shapes (e.g., anchors). To find RT anchors in the entire scene (e.g., in the scene model and/or in the scene data) or a portion thereof, in some embodiments, the processor may be configured to again execute one or more histogram comparison functions, as described above. In some embodiments, the processor may compare design-time object data to image data collected at run-time, e.g., with or without comparing histograms, depending on the instance, e.g., by comparing contours. In some embodiments, e.g., if the contours are essentially identical, the processor may continue verification of the scene.

Anchors contain information/data regarding contours calculated for the shape content (picture, text, lines, etc.) that are typically constant. As such, detection of matching anchors is typically an indication that a correct (matching) scene has been identified. At step 950, if no anchors are detected, then, in some embodiments, the processor may be configured to recapture the run-time application image at step 955, for example during an application repaint event, and the process continues with step 925. In some embodiments, recapturing the application may resolve any mismatching and/or detection issues.

If one or more anchors are found at step 945, then at step 960, in some embodiments, the processor may be configured to find (e.g., detect, identify, etc.) one or more control shapes (e.g., controls), for example, based on identified anchors. In some embodiments, controls may be searched for in the same or a similar manner as anchors. To find RT controls in the entire scene (e.g., in the scene model and/or in the scene data) or a portion thereof, in some embodiments, the processor may be configured to again execute one or more histogram comparison functions, as described above. In some embodiments, the processor may compare design-time object data to image data collected at run-time, e.g., with or without comparing histograms, depending on the instance. However, it should be noted that controls are not necessarily constant (as they typically are with anchors), and their contours may be somewhat different, and thus controls may, in some embodiments, be more readily identified via comparison of histograms.

At step 965, if no controls are detected, then, in some embodiments, the processor may be configured to recapture the run-time application image at step 955, for example during an application repaint event, and the process continues with step 925. In some embodiments, recapturing the application may resolve any mismatching and/or detection issues.

At step 970, in some embodiments, the processor may be configured to find (e.g., detect, identify, etc.) one or more control shapes (e.g., controls), for example, based on previously defined or identified geometric relationships. To find RT controls in the entire scene (e.g., in the scene model and/or in the scene data) or a portion thereof, in some embodiments, for example, when one or more controls have been bound or attached to a particular anchor or anchors, the processor may be configured to identify such controls based on searching geometric relationships between controls and anchors. In some embodiments, such as when one or more controls have not been bound or attached to any specific anchors, the processor may be configured to search for and detect geometric relationships between controls and any or all anchors already identified on the scene. Of course, the processor may execute one or more histogram comparison functions as well, as described above.

At step 975, if again no controls are detected, then, in some embodiments, the processor may be configured to recapture the run-time application image at step 955, for example during an application repaint event, and the process continues with step 925. In some embodiments, recapturing the application may resolve any mismatching and/or detection issues.

At step 980, in some embodiments, the processor may be configured to find (e.g., detect, identify, etc.) any user-drawn controls (e.g., control shapes). To recognize user-drawn control shapes and their respective coordinates, in some embodiments, the processor may calculate geometric relationships between the specific control and any or all other controls and anchors found on this scene.

Finally, at step 985, in some embodiments, e.g., when all or a threshold amount of the anchors and controls defined in the scene are recognized, then the processor may be configured to mark the scene as recognized (e.g., identified) and interaction with the GUI of the run-time application may be enabled. For example, in some embodiments, in order to realize the object model, the processor may emulate run-time control methods, properties and/or events of the design-time bounding shape objects by, e.g., generating, constructing, assigning, defining, or otherwise enabling the one or more RT bounding shape objects such that they have the same or a similar defined set of properties, methods, features, and/or events specific for an identified or given object as those of the one or more DT bounding shape objects. For example, for input emulation (mouse, keyboard, etc.) the processor may be configured to use such functions as SendInput, SendMessage and PostMessage functions (e.g., for the Windows API). The processor may further use mouse and keyboard hooks (Windows API) to receive user activity events. For content change events the processor may check and identify contours changing in the control. As before, the processor may also intercept image paint calls (BitBlt, StrechBlt etc.) in order to change the application state. Turning briefly to FIG. 10, a control methods, properties, and events table is provided according to at least one embodiment of the invention.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method for enabling graphic-based interoperability with a run-time application, performed on a computer having a processor, a memory, and one or more code sets stored in the memory and executed by the processor, the method comprising:

during a design-time mode:
receiving, by the processor, a design-time application image;
identifying, by the processor, one or more design-time visual objects within the design-time application image;
generating, by the processor, one or more design-time bounding shape objects, wherein each of the one or more design-time bounding shape objects bounds one or more of the one or more design-time visual objects identified within the design-time application image;
defining, by the processor, one or more bounding shape properties for at least one of the one or more design-time bounding shape objects; and
storing, by the processor, as a scene, data relating to the design-time application image, the one or more design-time visual objects, the one or more design-time bounding shape objects, and the one or more bounding shape properties, for later recall; and during a run-time mode:
recalling, by the processor, the scene stored during the design-time mode;
capturing, by the processor, a run-time application image displaying on a display in a remote desktop environment;
identifying, by the processor, one or more run-time visual objects within the run-time application image based on the scene;
generating, by the processor, one or more run-time bounding shape objects, and
applying, by the processor, one or more of the one or more bounding shape properties to one or more of the generated one or more run-time bounding shape objects in the display.

2. The method as in claim 1, wherein identifying the one or more design-time visual objects comprises identifying at least one of one or more edges and one or more contours which define at least part of a given visual object.

3. The method as in claim 1, wherein defining the one or more shape properties comprises: identifying, by the processor, at least one anchor;
wherein an anchor represents a given visual object in the design-time application image having internal content which remains constant from the design-time mode to the run-time mode.

4. The method as in claim 1, wherein defining the one or more shape properties comprises: identifying, by the processor, at least one control;
wherein a control associates a given visual object with a control type for which an interaction with the control is defined within the run-time mode.

5. The method as in claim 4, wherein the control type comprises one of a frame window, a button, a link, a list box, a check box, a table, a drop-list, a combination box, a tab, and a slider.

6. The method as in claim 1, further comprising: constructing, by the processor, a design-time histogram based on the defined one or more bounding shape properties.

7. The method as in claim 1, wherein recalling comprises at least one of:
recalling, by the processor, the design-time application image;
regenerating, by the processor, the one or more design-time bounding shape objects;
redefining, by the processor, the one or more bounding shape properties for at least one of the one or more design-time bounding shape objects; and
reconstructing, by the processor, the design-time histogram based on the defined one or more bounding shape properties.

8. The method as in claim 1, wherein the one or more run-time visual objects comprises at least one of a window frame, an anchor, and a control.

9. The method as in claim 8, further comprising, identifying at least one control based on at least one of:
an anchor to which it is bound; and
a geometric relationship between the at least one control and other previously identified objects in the run-time application image.

10. The method as in claim 1, wherein generating the one or more run-time bounding shape objects comprises building an object model of the corresponding type of graphical user interface (GUI) object for each of the one or more run-time bounding shape objects, wherein an object model includes a given plurality of bounding shape properties.

11. The method as in claim 1, wherein applying the one or more of the one or more bounding shape properties to one or more of the constructed one or more run-time bounding shape objects bounds each of the corresponding run-time bounding shape objects with respective graphics image elements.

12. A system for enabling graphic-based interoperability with a run-time application comprising:
a computer having a processor and memory; and
one or more code sets stored in the memory and executing in the processor, which, when executed, configure the processor to:

during a design-time mode:
receive a design-time application image;
identify one or more design-time visual objects within the design-time application image;
generate one or more design-time bounding shape objects, wherein each of the one or more design-time bounding shape objects bounds one or more of the one or more design-time visual objects identified within the design-time application image;
define one or more bounding shape properties for at least one of the one or more design-time bounding shape objects; and
store as a scene, data relating to the design-time application image, the one or more design-time visual objects, the one or more design-time bounding shape objects, and the one or more bounding shape properties, for later recall; and during a run-time mode:
recall the scene stored during the design-time mode;
capture a run-time application image displaying on a display in a remote desktop environment;
identify one or more run-time visual objects within the run-time application image based on the scene;
generate one or more run-time bounding shape objects, and apply one or more of the one or more bounding shape properties to one or more of the generated one or more run-time bounding shape objects in the display.

13. The system as in claim 12, wherein, in identifying the one or more design-time visual objects, the processor is configured to identify at least one of one or more edges and one or more contours which define at least part of a given visual object.

14. The system as in claim 12, wherein, in defining the one or more shape properties, the processor is configured to identify at least one anchor;
   wherein an anchor represents a given visual object in the design-time application image having internal content which remains constant from the design-time mode to the run-time mode.

15. The system as in claim 12, wherein, in defining the one or more shape properties, the processor is configured to identify at least one control;
   wherein a control associates a given visual object with a control type for which an interaction with the control is defined within the run-time mode.

16. The system as in claim 15, wherein the control type comprises one of a frame window, a button, a link, a list box, a check box, a table, a drop-list, a combination box, a tab, and a slider.

17. The system as in claim 12, wherein the processor is further configured to: construct a design-time histogram based on the defined one or more bounding shape properties.

18. The system as in claim 12, wherein, in recalling, the processor is configured to at least one of:
   recall the design-time application image;
   regenerate the one or more design-time bounding shape objects;
   redefine the one or more bounding shape properties for at least one of the one or more design-time bounding shape objects; and
   reconstruct the design-time histogram based on the defined one or more bounding shape properties.

19. The system as in claim 12, wherein the one or more run-time visual objects comprises at least one of a window frame, an anchor, and a control.

20. The system as in claim 19, wherein the processor is further configured to identify at least one control based on at least one of:
   an anchor to which it is bound; and
   a geometric relationship between the at least one control and other previously identified objects in the run-time application image.

21. The system as in claim 12, wherein, in generating the one or more run-time bounding shape objects, the processor is configured to: build an object model of the corresponding type of graphical user interface (GUI) object for each of the one or more RT bounding shape objects, wherein an object model includes a given plurality of bounding shape properties.

22. The system as in claim 12, wherein, in applying the one or more of the one or more bounding shape properties to one or more of the constructed one or more run-time bounding shape objects, the processor is configured to bound each of the corresponding run-time bounding shape objects with respective graphics image elements.

* * * * *